A. S. DUNKLE & G. E. HARNER.
NUT LOCK.
APPLICATION FILED APR. 2, 1915.
1,199,675.
Patented Sept. 26, 1916.
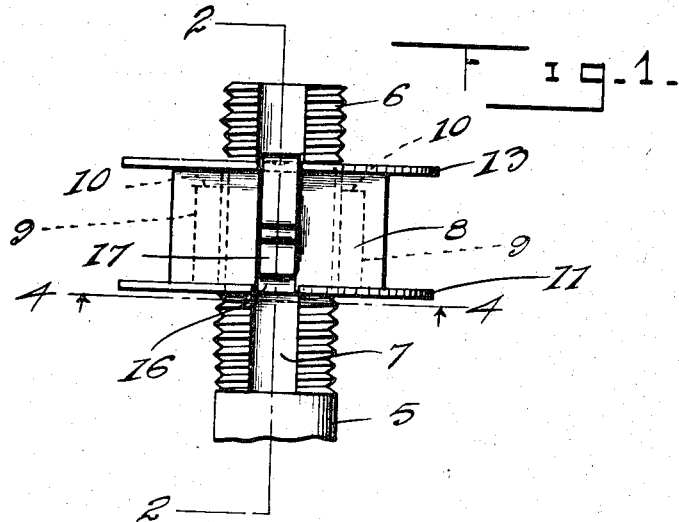
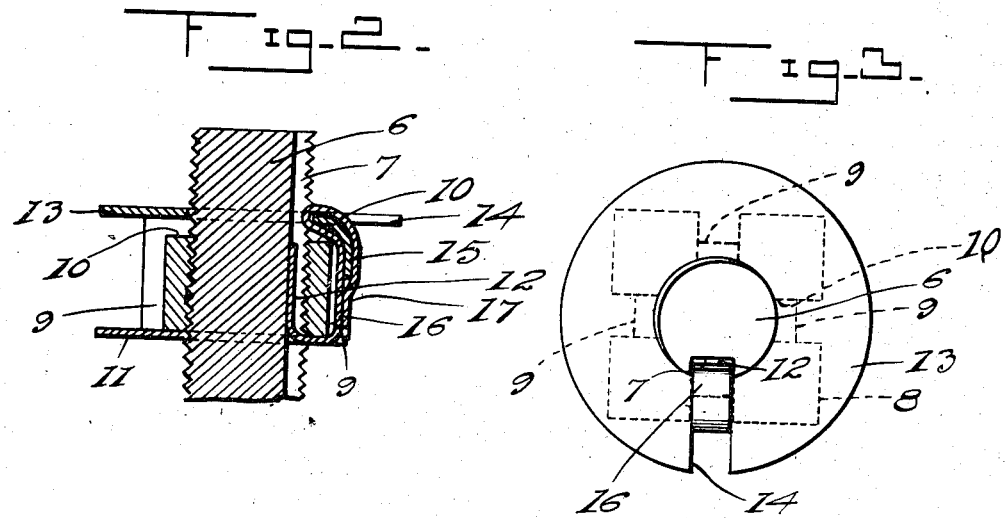
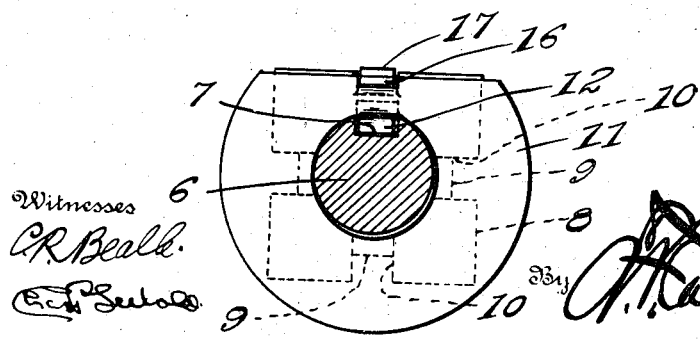
Witnesses
C. R. Beall.
Inventors
A. S. Dunkle,
G. E. Harner,
By
Attorney

UNITED STATES PATENT OFFICE.

ARTHUR S. DUNKLE AND GEORGE E. HARNER, OF HOLTWOOD, PENNSYLVANIA.

NUT-LOCK.

1,199,675.  Specification of Letters Patent.  Patented Sept. 26, 1916.

Application filed April 2, 1915.  Serial No. 18,798.

*To all whom it may concern:*

Be it known that we, ARTHUR S. DUNKLE and GEORGE E. HARNER, citizens of the United States, residing at Holtwood, in the county of Lancaster and State of Pennsylvania, have invented certain new and useful Improvements in Nut-Locks; and we do hereby declare the following to be a full, clear, and exact description of the invention, such as will enable others skilled in the art to which it appertains to make and use the same.

This invention has for its object to provide a nut lock of simple and efficient construction including essentially a pair of plates or washers arranged upon opposite sides of the nut and having interlocking tongues engaged within grooves formed in the nut for reliably locking the latter against rotational movement upon the bolt.

With this and other objects in view, the invention consists in the novel construction, arrangement and formation of parts as will be hereinafter specifically described, claimed and illustrated in the accompanying drawing, in which:

Figure 1 represents a side elevation of the nut lock. Fig. 2 represents a longitudinal sectional view on the line 2—2 of Fig. 1. Fig. 3 represents an end elevation of the nut lock. Fig. 4 represents a transverse sectional view on the line 4—4 of Fig. 1.

Referring to the drawing in detail, wherein similar reference numerals designate corresponding parts throughout the several views, the numeral 5 indicates the shank of a bolt having screwthreads 6 extending inwardly from one end, which latter is formed with a longitudinal slot or groove 7. A nut 8 of the preferred type is fitted upon the screwthreaded end 6 of the bolt and is formed in each side face with a groove or slot 9 extending parallel with the internally screwthreaded bore and communicating with slots or grooves 10 on the outer face thereof and extending radially of the bore. A circular washer or plate 11 is formed with a central aperture receiving the threaded end of the bolt, is engaged with the inner surface of the nut 8 and provided with an angularly directed extension or tongue 12 engaged within the longitudinal slot or groove 7 to lock the washer 11 against rotational movement upon the bolt. A washer 13 is provided with a central aperture receiving the shank 6 of the bolt and is engaged with the outer surface of the nut 8. The washer 13 is formed with a pair of spaced parallel slits 14 defining an angularly directed tongue 15 disposed over one of the side faces of the nut 8. The washer plate 11 is provided with an angularly directed tongue or extension 16 extended in parallel relation with the tongue 12, engaged within one of the grooves 9 and registering groove 10 and is extended under the washer plate 13 and bent back upon itself over the tongue 15, as indicated at 17.

In use, the washer plate 11 is positioned upon the threaded end 6 of the bolt shank in front of the nut 8, which latter is advanced to the desired position upon the bolt. When the nut is moved to the desired position the tongue 16 of the washer plate 11 is bent into one of the grooves 9 of the nut and also into the portion of the longitudinal slot 7 disposed outwardly of the nut. The washer plate 13 is subsequently positioned upon the bolt and is engaged with the outer surface of the nut 8 and the free end 17 of the tongue 16 is bent back, as clearly illustrated in Fig. 2, to securely fasten the washer plates 11 and 13 together. It is clearly evident that the washer plate 11 is reliably locked against rotational movement upon the bolt shank by the inner tongue 12, while the nut 8 is locked against rotational movement relative to the washer plate 11 by the tongue 16 which is engaged within one of the grooves 9 and is reliably retained in adjusted position by the washer 13.

What we claim is:

In combination, a bolt having a longitudinal slot, a nut fitted upon said bolt and having grooves in the side faces thereof, washers engaged with the inner and outer faces of said nut, a curved tongue carried by the outer washer and overlying one of the side faces of said nut, an angular tongue or extension carried by the inner edge of the inner washer extending through said slot under said nut, and a tongue carried by the outer edge of the inner washer engaged within one of the grooves in said nut extending through the central aperture of the outer washer, into the slot in the bolt and being bent back over the first mentioned tongue to clamp the inner and outer washers in engagement with the inner and outer faces of the nut and prevent rotation of the latter with relation to said washers.

In testimony whereof we affix our signatures in presence of two witnesses.

ARTHUR S. DUNKLE.
GEORGE E. HARNER.

Witnesses:
C. H. ARMSTRONG,
REBA ARMSTRONG.